United States Patent
Ishigami et al.

(10) Patent No.: US 10,731,760 B2
(45) Date of Patent: Aug. 4, 2020

(54) SEALING STRUCTURE

(71) Applicant: MAHLE FILTER SYSTEMS JAPAN CORPORATION, Tokyo (JP)

(72) Inventors: Shintaro Ishigami, Fujimi (JP); Takashi Uchino, Kawagoe (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 93 days.

(21) Appl. No.: 15/835,897

(22) Filed: Dec. 8, 2017

(65) Prior Publication Data

US 2018/0163868 A1 Jun. 14, 2018

(30) Foreign Application Priority Data

Dec. 9, 2016 (JP) .................... 2016-238957

(51) Int. Cl.
| | |
|---|---|
| *F16J 15/02* | (2006.01) |
| *F16J 15/08* | (2006.01) |
| *F16J 15/10* | (2006.01) |
| *F16J 15/06* | (2006.01) |

(52) U.S. Cl.
CPC .......... *F16J 15/025* (2013.01); *F16J 15/061* (2013.01); *F16J 15/062* (2013.01); *F16J 15/0893* (2013.01); *F16J 15/106* (2013.01)

(58) Field of Classification Search
CPC ........ F16J 15/025; F16J 15/061; F16J 15/062; F16J 15/0893; F16J 15/106
See application file for complete search history.

(56) References Cited

U.S. PATENT DOCUMENTS

| | | | | |
|---|---|---|---|---|
| 2004/0000763 A1* | 1/2004 | Gernand | ................ | F16J 15/061 277/630 |
| 2004/0056429 A1* | 3/2004 | Okazaki | ................ | F16J 15/061 277/627 |
| 2008/0265523 A1* | 10/2008 | Galpin | ................... | F16J 15/061 277/590 |

(Continued)

FOREIGN PATENT DOCUMENTS

| | | |
|---|---|---|
| EP | 2 746 626 A1 | 6/2014 |
| EP | 2 754 926 A1 | 7/2014 |

(Continued)

OTHER PUBLICATIONS

European Search Report, dated Apr. 24, 2018, 8 pages.

*Primary Examiner* — Eugene G Byrd
(74) *Attorney, Agent, or Firm* — Foley & Lardner LLP

(57) ABSTRACT

A gasket inserted into a gasket groove is formed of a gasket main body part positioned in the middle part thereof and first/second end face projection parts each formed in a tapered shape, projecting from corresponding ones of the ends of the gasket main body part. Each of pressure-contact surfaces of the gasket main body part is formed as an arc-shaped surface having a convex shape projecting toward a corresponding one of the inner side surfaces of the gasket groove. The rate of the sum of the sectional areas of the first/second end face projection parts to the whole sectional area of the gasket is 30% or less, and the rate of the curvature radius of each of the tip end surfaces of the respective first/second end face projection parts to the maximum width dimension of the gasket main body part is 15% or less.

5 Claims, 7 Drawing Sheets

(56) References Cited

U.S. PATENT DOCUMENTS

| | | | | |
|---|---|---|---|---|
| 2010/0044970 A1* | 2/2010 | Suzuki | ........... | F16J 15/061 |
| | | | | 277/592 |
| 2010/0084827 A1* | 4/2010 | Peddle | ........... | F16J 15/061 |
| | | | | 277/644 |
| 2010/0264606 A1* | 10/2010 | Hayashi | ........... | F16J 15/061 |
| | | | | 277/641 |
| 2011/0169228 A1* | 7/2011 | Karram | ........... | F16J 15/061 |
| | | | | 277/650 |
| 2011/0227295 A1* | 9/2011 | Watanabe | ........... | F02F 11/002 |
| | | | | 277/591 |
| 2013/0249173 A1* | 9/2013 | Yamamoto | ........... | F16J 15/024 |
| | | | | 277/639 |
| 2015/0233475 A1* | 8/2015 | Yu | ........... | F16J 15/061 |
| | | | | 277/590 |
| 2016/0230889 A1* | 8/2016 | O'Brien | ........... | H01J 49/24 |
| 2017/0138480 A1* | 5/2017 | Yu | ........... | F16J 15/104 |

FOREIGN PATENT DOCUMENTS

| | | | |
|---|---|---|---|
| GB | 2461483 A | | 1/2010 |
| JP | 2002195411 A | * | 7/2002 |
| JP | 2013-40673 A | | 2/2013 |
| JP | 2013-79667 A | | 5/2013 |
| WO | WO 2016/006393 A1 | | 1/2016 |

* cited by examiner

# SEALING STRUCTURE

BACKGROUND OF THE INVENTION

This invention relates to a sealing structure using a gasket which is used for, for example, the joint part between an engine and an intake manifold mounted on a vehicle.

As this type of the sealing structure using the gasket, one is suggested which is described in Japanese Patent Application Publication No. 2013-040673. In this sealing structure of JP 2013-040673 (A), a gasket as a main body has a gasket main body part whose first end is brought into tight contact with the groove bottom surface of the installation groove formed in a first member, and whose second end is brought into tight contact with a second member, a pair of first and second side surface lips which is brought into tight contact with the groove side surfaces of the installation groove in a part close to the groove bottom part of the installation groove, and has a pair of third and fourth side surface lips which is brought into tight contact with the groove side surfaces of the installation groove in a part close to the groove opening part of the installation groove.

In a case where the gasket width dimension in the first and second side surface lips is defined as W1, the gasket width dimension in the third and fourth side surface lips is defined as W2, the groove width dimension of the installation groove in the position where the first and second surfaces lips are brought into tight contact with the installation groove is defined as W3, and the groove width dimension of the installation groove in the position where the third and fourth side surface lips are brought into tight contact with the installation groove is defined as W4, each of the dimensions is set so as to satisfy the relations of W3<W4 and W1<W2.

SUMMARY OF THE INVENTION

However, in the sealing structure described in JP 2013-040673 (A), the sectional shape of the gasket is formed to have a specific sectional shape, to suppress the inclination of the gasket and the slip-off (float) of the gasket from the taper-shaped installation groove caused by the influence of the increasing of the dimension tolerance of the installation groove formed in the first member. On the other hand, when attention is paid to a sealing structure used for the joint part between an engine and an intake manifold mounted on a vehicle, the reduction in the size of the sectional shape of a gasket and the reduction in the size of the shape of the groove to which the gasket is attacked tend to be required also in the joint part between the engine and the intake manifold, to reduce the size (space saving) and the weight of the engine. In this case, from these viewpoints, there is still room for improvement in the sealing structure described in JP 2013-040673 (A).

For example, in many cases, the sectional shape of a gasket made of rubber-based elastic materials is formed in consideration of the compression permanent set of the gasket itself, a change in interference caused by the deformation of a member formed with a groove for receiving the gasket and the lowering of surface pressure. Therefore, when the size of the sectional shape of the gasket is simply reduced, the surface pressure becomes insufficient in many cases, and it is not possible to stably exhibit necessary functions by the sealing structure described in JP 2013-040673 (A).

The present invention was made in consideration of such a problem. The present invention can provide a sealing structure with which expected functions can be stably obtained while suppressing the lowering of contact pressure, even in a case where the size of the sectional shape of a gasket is reduced.

In the present invention, a sealing structure includes: a gasket groove formed in a first member; and a gasket inserted into the gasket groove, wherein the gasket is compressed and deformed by the butting of the first member against a second member, and the space between the first member and the second member is sealed, and wherein the inner side surfaces positioned on both of the respective sides of a groove bottom surface of the gasket groove are formed parallel to each other.

In addition, the gasket, in its section, is formed of: a gasket main body part whose both outer side surfaces in a width direction become pressure-contact surfaces to corresponding ones of the inner side surfaces of the gasket groove; and first and second end face projection parts projecting to both sides in a height direction orthogonal to the width direction from the gasket main body part, and each having a width narrower than that of the gasket main body part and each having a tapered shape, wherein the first end face projection part is brought into pressure contact with the groove bottom surface and the second end face projection part is brought into pressure contact with the second member, and each of the pressure-contact surfaces of the gasket main body part is formed as an arc-shaped surface formed in a convex shape projecting toward a corresponding one of the inner side surfaces of the gasket groove.

DETAILED DESCRIPTION OF THE INVENTION

Figure 1:
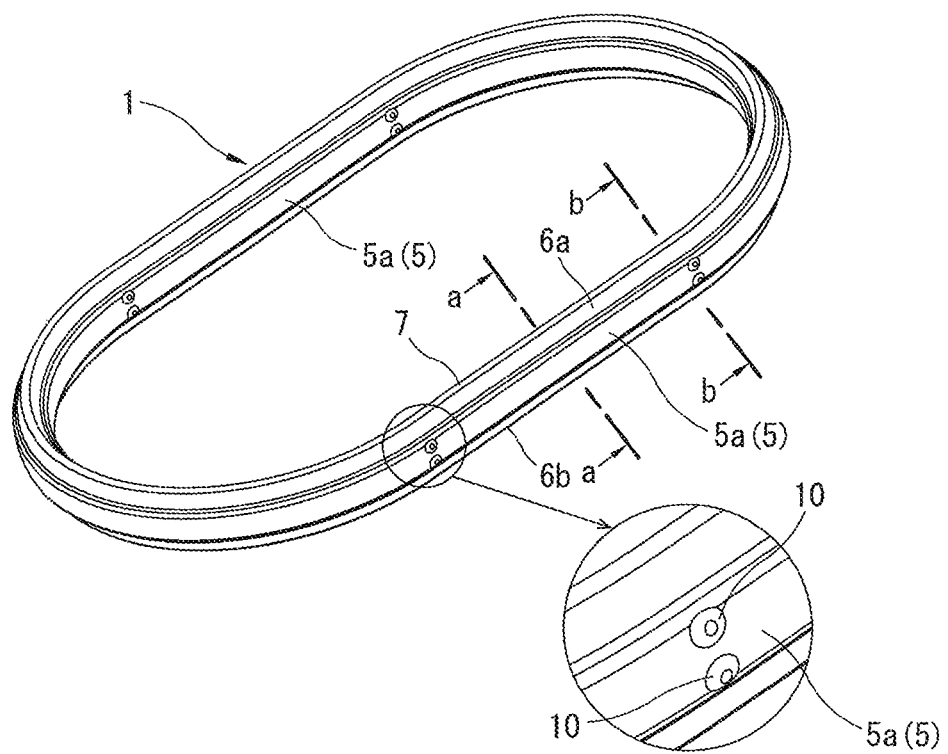
FIG. 1 is a drawing showing a first embodiment for implementing a sealing structure according to the present invention, and is a perspective view showing the appearance shape of a gasket which becomes the main element of the sealing structure.
Figure 2:
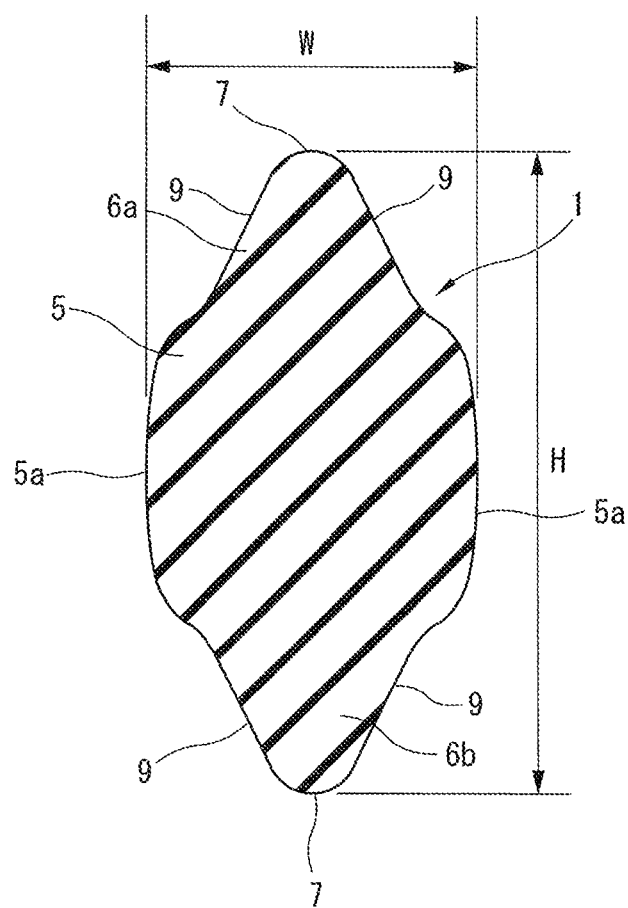
FIG. 2 is an enlarged sectional view taken along a line a-a of FIG. 1.
Figure 3:
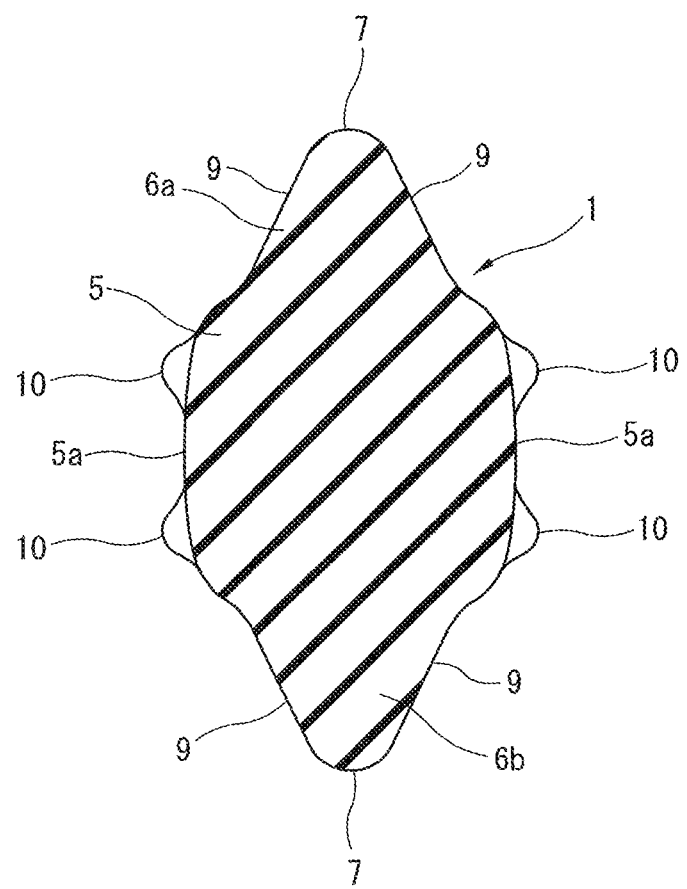
FIG. 3 is an enlarged sectional view taken along a line b-b of FIG. 1.
Figure 4:
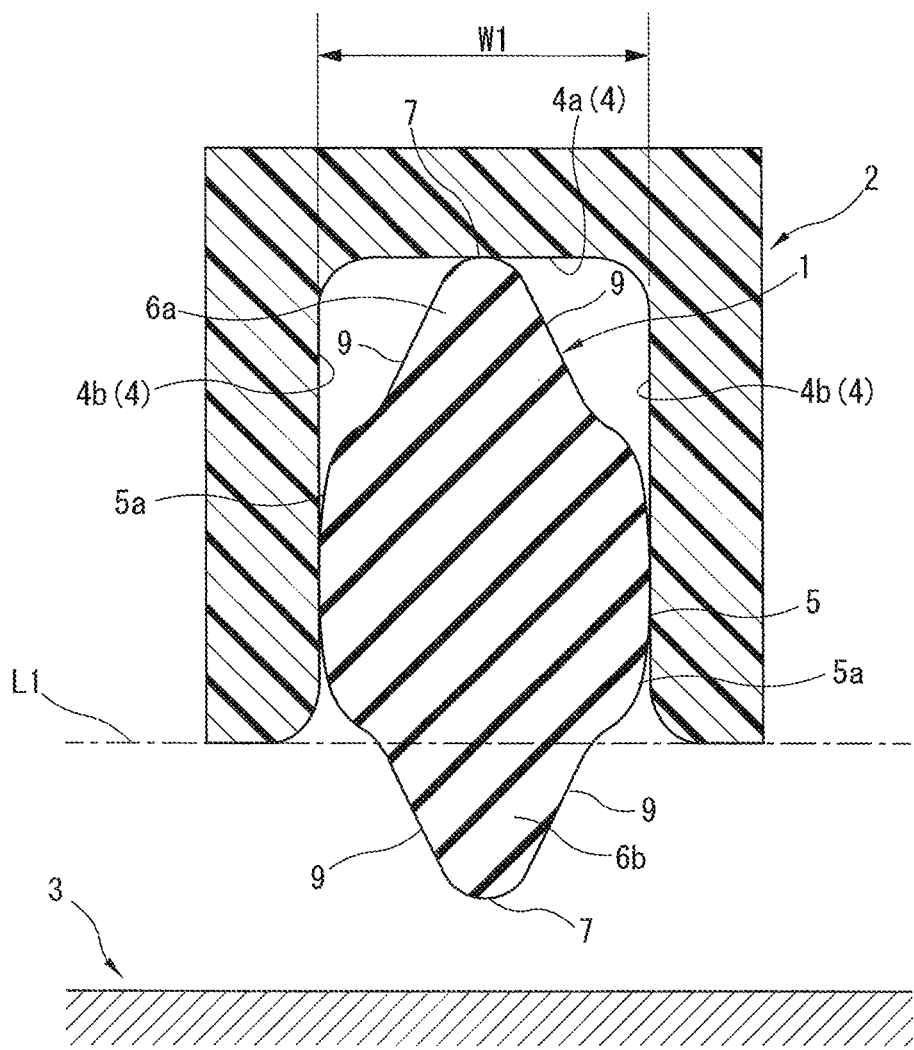
FIG. 4 is an enlarged sectional view in a non-compressed state in which the gasket has been inserted into a gasket groove.

FIG. 1 to FIG. 7 show a first embodiment for implementing a sealing structure according to the present invention. FIG. 1 is a perspective view showing the appearance shape of a gasket 1 which becomes the main element of the sealing structure. FIG. 2 is an enlarged sectional view taken along a line a-a of FIG. 1 when the cross section orthogonal to the longitudinal direction or the circumferential length direction of the gasket 1 is used as a base sectional shape. In addition FIG. 3 is an enlarged sectional view taken along a line b-b of FIG. 1, and FIG. 4 is an enlarged sectional view in a non-compression state in which the gasket 1 has been inserted into a gasket groove 4.

As shown in FIG. 1, the planar shape of the gasket 1 which becomes the main element of the sealing structure is formed in an oval or elliptic closed-loop shape, and is integrally formed with rubber-based elastic materials having heat resistance and oil resistance in view of functions.

As shown in FIG. 4, in the joint part at which first and second members 2 and 3 butt against each other and to which the sealing structure including the gasket 1 as the main element is applied, the flat joint surface of the first member 2 is formed with a closed-loop-shaped gasket groove 4 having a square groove shape, which is similar to the gasket 1. The gasket 1 is inserted into the gasket groove 4 such that the depth direction of the gasket groove 4 coincides with the height direction of the gasket 1. In the gasket groove 4 shown in FIG. 4, inner side surfaces 4b are positioned on both of the sides of a groove bottom surface 4a, and formed as flat surfaces parallel to each other.

Figure 9:
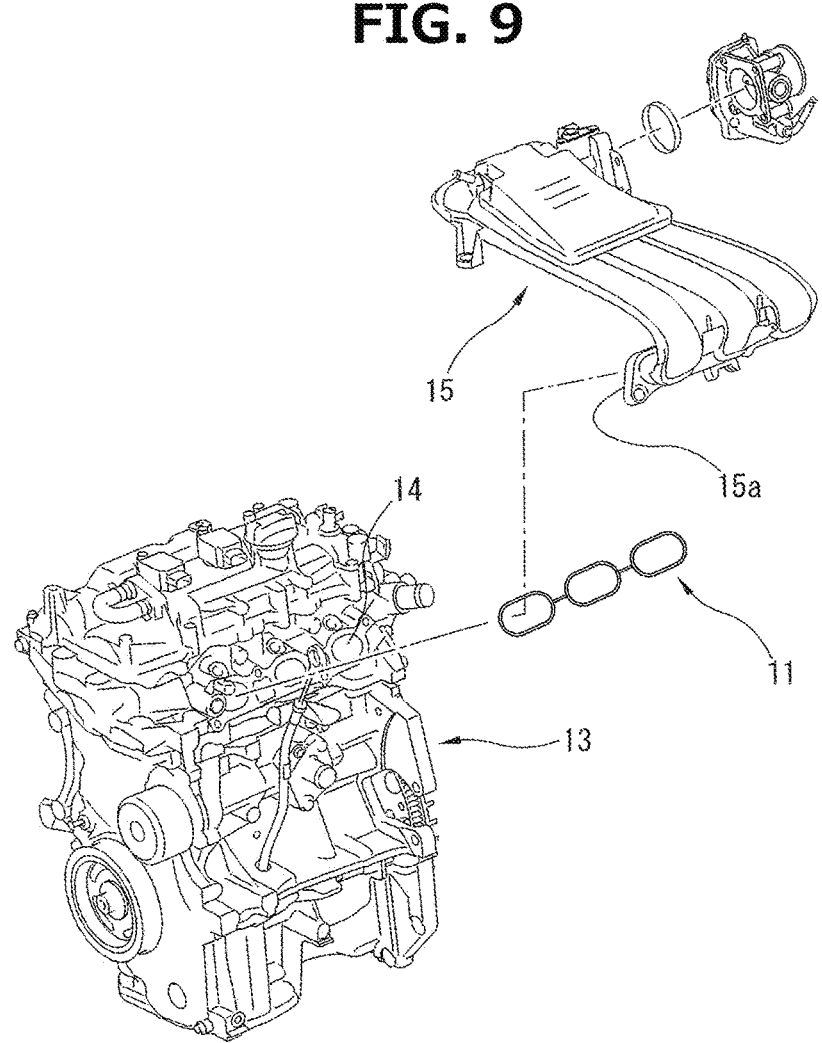
FIG. 9 is a perspective exploded view of an engine in which the gasket shown in FIG. 8 is applied.

As an application example of the sealing structure with the gasket 1, when the sealing structure including the gasket 1 is applied in a case where the joint part between an engine and an intake manifold is assumed, as shown in FIG. 9 mentioned below, the first member 2 corresponds to, for example, an intake manifold 15 made of resin, and the second member 3 corresponds to, for example, a cylinder head made of aluminum alloys having intake ports 14. In addition, as shown in FIG. 4, a round chamfering part is formed in each of the inner corner sections of the groove bottom surface 4a of the gasket groove 4 and in each of the outer corner sections on the opened side of the gasket groove 4. However, the round chamfering part is not always essential.

The base sectional shape of the cross section orthogonal to the longitudinal direction or the circumferential length direction of the gasket 1 shown in FIG. 1 is shown in FIG. 2. Here, its cross sectional shape is formed in a symmetrical shape and in a vertically symmetrical shape, and is uniformly formed over the whole length in the longitudinal direction or the circumferential length direction of the gasket 1. In addition, the gasket 1 is formed of a gasket main body part 5 having a maximum width dimension W which occupies a large area in the middle part of the gasket 1, and of taper-shaped first and second end face projection parts 6a and 6b projecting toward corresponding ones of both sides in a height direction orthogonal to a width direction from the gasket main body part 5. In addition, a height dimension H of the gasket 1 is set larger than the maximum width dimension W of the gasket main body part 5.

As shown in FIG. 4, both of the outer side surfaces in the width direction of the gasket main body part 5 become pressure-contact surfaces 5a which are brought into pressure contact with corresponding ones of the inner side surfaces 4b of the gasket groove 4. Each of the pressure-contact surfaces 5a is formed as a smooth arc-shaped surface or curved surface having a convex shape toward a corresponding one of the inner side surfaces 4b. In addition, as shown in FIG. 2 and FIG. 4, in the free state in which the gasket 1 has not been compressed, the maximum width dimension W of the gasket main body part 5 which corresponds to the distance between the pressure-contact surfaces 5a is set to the dimension approximately equal to the dimension of a groove width W1 of the gasket groove 4.

Tip end surfaces 7 of the respective first and second end face projection parts 6a and 6b projecting in the height direction from corresponding ones of the ends of the gasket main body 5 are each formed as an arc-shaped surface having a predetermined curvature. Both of the first and second end face projection parts 6a and 6b and the gasket main body part 5 are integrally formed, such that the width dimension of each of the first and second end face projection parts 6a and 6b becomes continuously large from the end surface 7 side of each of the first and second end face projection parts 6a and 6b toward the gasket main body part 5 side.

Figure 5:
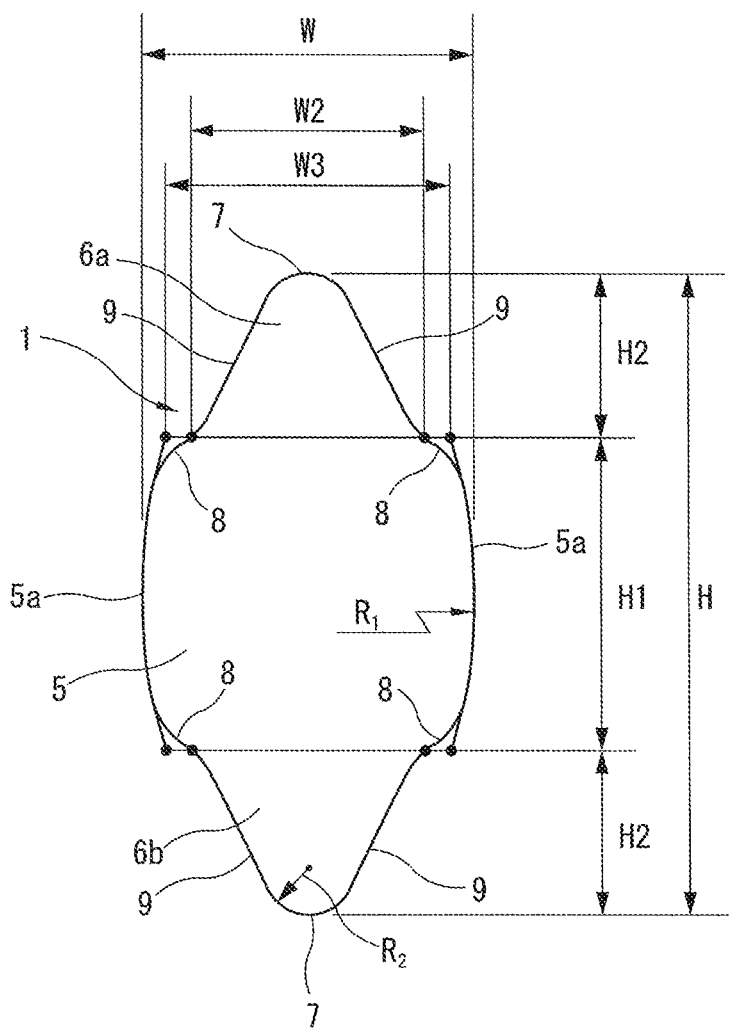
FIG. 5 is an explanation drawing showing the dimension of each part of the gasket shown in FIG. 2.

FIG. 5 is an enlarged sectional explanation drawing in which dimension lines are added which are required to easily understand the boundaries between the gasket main body part 5 and each of the first and second end face projection parts 6a and 6b shown in FIG. 2, and hatching is not intentionally shown. In this FIG. 5, a reference sign H1 of a height dimension H of the gasket 1 shows the region of the gasket main body part 5, and reference signs H2 thereof show the respective regions of the first and second end face projection parts 6a and 6b. The height dimension H1 of the gasket main body part 5 is set to an approximately half of the height dimension H of the whole gasket 1, and the height dimensions H2 of the respective first and second end face projection parts 6a and 6b are equal to each other. In addition, the maximum width dimension W of the gasket main body part 5 is set equal to or slightly larger than the height dimension H1 of the gasket main body part 5.

More specifically, a width dimension W2 in each of the root parts (maximum width part) of the first and the second end face projection parts 6a and 6b, root parts which are the respective boundaries between the gasket main body part 5 and each of the first and second end face projection parts 6a and 6b, is set smaller than a minimum width dimension W3 in each of both of the ends in the height direction of the gasket main body part 5. In addition, each of the ends of the gasket main body part 5 in the height direction is smoothly connected to a corresponding one of the root parts of the respective width dimensions W2 of the first and second end face projection parts 6a and 6b through a corresponding one of round chamfering parts 8. Consequently, the gasket main body part 5 is connected to each of the first and second end face projection parts 6a and 6b through smooth step parts corresponding to the substantially S-shaped round chamfering parts 8. Inclined surfaces 9 connecting the tip end surfaces 7 of the respective first and second end face projection parts 6a and 6b to corresponding ones of the round chamfering parts 8 are not formed as arc-shaped surfaces but are formed as flat surfaces.

In addition, as shown in FIG. 4, when attention is paid to the relation between the area of the gasket main body part 5 corresponding to the area within the ranges of the maximum width dimension W and the height dimension H1 and the sum of the areas of the first and second end face projection parts 6a and 6b corresponding to the areas in the ranges of the height dimensions H2 of both of the ends of gasket main body parts 5, to stably secure the surface pressure, the sum of the areas of both of the first and second end face projection parts 6a and 6b is set to be 30% or less of the area of the whole gasket 1. More specifically, the area of the gasket main body part 5 is set to be 74% of the area of the whole gasket 1, and the sum of the areas of both of the first and second end face projection parts 6a and 6b is set to be approximately 26% of the area of the whole gasket 1.

Moreover, as shown in FIG. 4, in the non-compression state in which the gasket 1 has been inserted into the gasket groove 4 having a square groove shape formed in the first member 2, that is, in a case where the gasket 1 is inserted and brought into contact with the groove bottom surface 4a such that each of the pressure-contact surfaces 5a is brought into point contact with a corresponding one of the inner side surfaces 4b of the gasket groove 4 without the compression of the first end face projection part 6a, the area projecting outward from the gasket groove 4 (the area projecting to the outside of the gasket groove 4 from a virtual line L1 shown in FIG. 4) is set to be approximately 15% of the area of the gasket 1 occupying the inside of the gasket groove 4 (the area on the gasket groove 4 side from the virtual line L1 shown in FIG. 4). Here, as previously explained, since the dimension of the groove width W1 of the gasket groove 4 is set equal to the maximum width dimension W of the gasket main body part 5 in the gasket 1, in the state shown in FIG. 4, the gasket 1 is not compressed and deformed, and it can be substantially regarded as the free state of the gasket 1.

Figure 6:
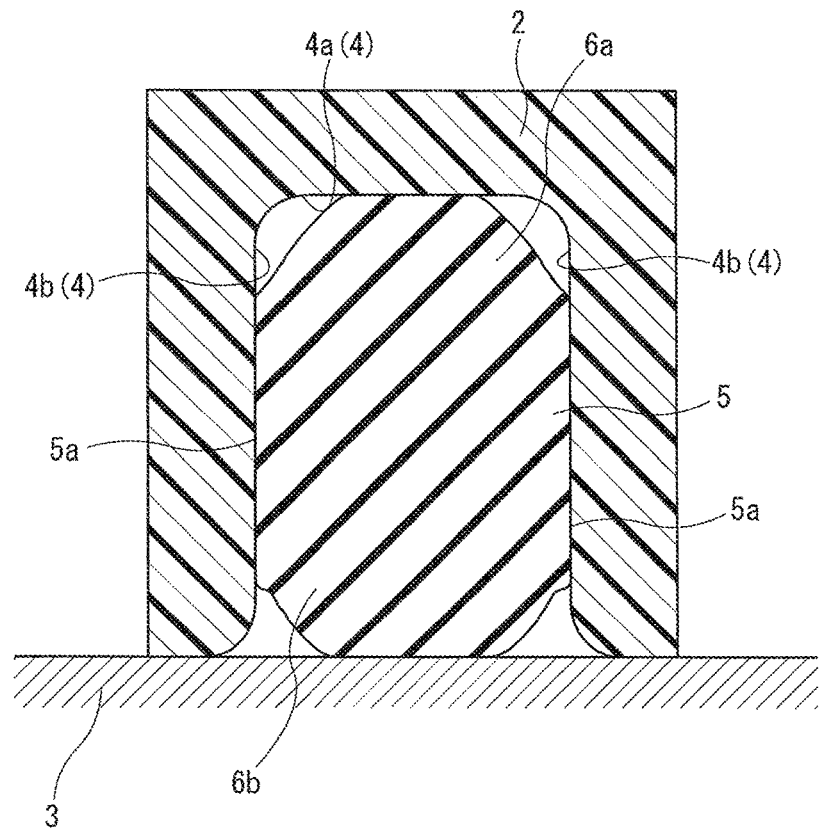
FIG. 6 is a sectional view showing a state in which the gasket has been compressed from the non-compressed state of FIG. 4.

As explained above, since the area of the gasket main body part 5 is set to be 74% of the area of the whole gasket 1, and the sum of both of the areas of the first and second end face projection parts 6a and 6b are set to be approximately 26% of the area of the whole gasket 1, the area of one of the first and second end face projection parts 6a and 6b is set to be approximately 13% of the area of the whole gasket 1. As shown in FIG. 4, when the gasket 1 is inserted into the gasket groove 4, the second end face projection part 6b which is not brought into contact with the groove bottom surface 4a projects outside from the gasket groove 4. In addition, the second member 3 butts against the first member 2 formed with the gasket groove 4 to close the opening side of the gasket groove 4 so as to be tightly brought into contact with each other. Consequently, when the first member 2 and the second member 3 butt against each other, as shown in FIG. 6, the second end face projection part 6b projecting outside from the gasket groove 4 is compressed, and approximately 15% of the area to the area of the whole gasket 1 is compressed.

In a case where attention is paid to the relation between the curvature of each of the arc-shaped pressure-contact surfaces 5a in the gasket main body part 5 and the curvature of each of the arc-shaped tip end surfaces 7 of the respective first and second end face projection parts 6a and 6b when the maximum width dimension W of the gasket main body part 5 is defined as a reference, to stably secure the surface pressure, a curvature radius $R_1$ of each of the pressure-contact surfaces 5a is set to be approximately 1.67 times the maximum width dimension W, and a curvature radius $R_2$ of each of the tip end surfaces 7 of the respective first and second end face projection parts 6a and 6b is set to be 0.13 times the maximum width dimension W. That is, the curvature radius $R_2$ of each of the tip end surfaces 7 of the respective first and second end face projection parts 6a and 6b is set to be 15% or less of the maximum width dimension W.

In the gasket 1 shown in FIG. 1, its base sectional shape is shown in FIG. 2, and it is preferable that the base sectional shape of the gasket 1 is formed to be uniform in the longitudinal direction, and a pair of projection portions 10 is formed and arranged in the height direction on a part of each of the pressure-contact surfaces 5a in the gasket main body part 5 in the longitudinal direction. In addition, as shown in FIG. 3, it is preferable that a pair of the small projection portions 10 is formed and arranged in the height direction of the gasket 1 at each of four places in the longitudinal direction or the circumferential length direction of the gasket 1.

In addition, as shown in FIG. 1 and FIG. 3, in each of the four places in the longitudinal direction or the circumferential length direction of the gasket 1, the pair of the small conical shaped projection portions 10 is formed on each of the pressure-contact surfaces 5a of the gasket main body part 5. Moreover, the projection portions 10 are each formed at a part close to the root part of each of the first and second end face projection parts 6a and 6b. The diameter of the spherical tip end surface of each of these projection portions 10 is set to be, for example, approximately 0.5 mm. Each of these projection portions 10 functions as a slip-off preventing means of the gasket 1 from the gasket groove 4. As shown in FIG. 4, in a case of the non-compression state in which the gasket 1 has been inserted into the gasket groove 4, as shown in FIG. 1 and FIG. 3, in the places where the projection portions 10 are formed, each of the projection portions 10 is brought into pressure contact with a corresponding one of the inner side surfaces 4b of the gasket groove 4, even if the pressure-contact surfaces 5a of both of the sides of the gasket main body part 5 are slightly brought into point contact with corresponding ones of the inner side surfaces 4b of the gasket groove 4. With those projection portions 10, the slipping-off of the gasket 1 from the gasket groove 4 is prevented.

Accordingly, in the sealing structure using the gasket 1 as a main element, as shown in FIG. 4 and FIG. 6, the first member 2 in which the gasket 1 has been inserted into the gasket groove 4 in advance butts against the second member 3 so as to be brought into tight contact with each other, and consequently, the gasket 1 is compressed and deformed to the state shown in FIG. 6.

In this case, as shown in FIG. 2, the tip end surfaces 7 of the respective first and second end face projection parts 6a and 6b are each formed as an arc-shaped surface having a relatively small diameter, to increase the initial pressure applied to the seal surface of the second member 3 which becomes a counterpart at the time of the compression deformation of the gasket 1. On the other hand, the gasket main body part 5 positioned in the middle part of the gasket 1 is formed so as to have a sufficiently large cross sectional area, so as to differentiate rigidity from that of each of the first and second end face projection parts 6a and 6b, to perform the backup of both of the first and second end face projection parts 6a and 6b. With this, when the gasket 1 is compressed to the state shown in FIG. 6, its compression strain is concentrated on the tip end portions of both of the first and second end face projection parts 6a and 6b, and thereby, in the middle part of the gasket main body part 5, it becomes possible to keep restoring force of rubber-based elastic materials, even if permanent set in fatigue of material itself occurs caused by, for example, thermal input.

In addition, as is clear when the state of FIG. 4 is compared with the state of FIG. 6, the gasket main body part 5 which is slightly brought into point contact with the inner side surfaces 4b of the gasket groove 4 before being compressed is brought into pressure contact with the inner side surfaces 4b of the gasket groove 4 with the process of the compression deformation, and its deformation in the width direction (outer side) is limited, and consequently, the contact area of the gasket main body part 5 and the inner side surfaces 4b is increased. The reaction force from the inner side surfaces 4b of the gasket groove 4 can therefore be obtained. On the other hand, as mentioned above, since restoring force of rubber-based elastic materials in the middle part of gasket main body part 5 is kept, the reaction force from the inner side surfaces 4b of the gasket groove 4 is transmitted especially to the tip end portion of the second end face projection part 6b positioned on the second member 3 side through the gasket main body part 5. By the compression deformation of the second end face projection part 6b by the application of the reaction force, it becomes possible to suppress the lowering of the surface pressure against the second member 3. The suppression effect of the lowering of the surface pressure or maintaining effect of the surface pressure in the second end face projection part 6b largely depends on the shapes of the pressure-contact surfaces 5a of the gasket main body part 5 which are each formed as an arc-shaped surface having a convex shape projecting toward a corresponding one of the inner side surfaces 4b of the gasket groove 4.

Figure 7:
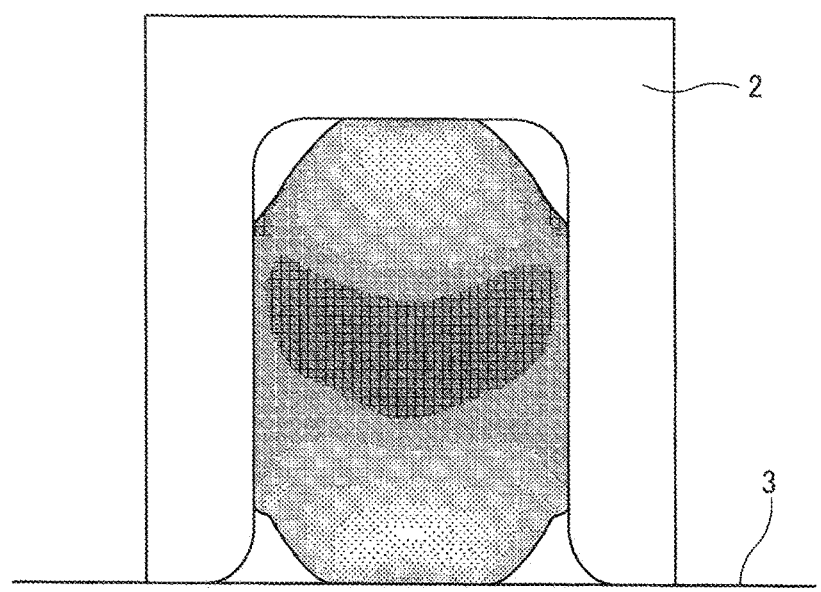
FIG. 7 is an explanation drawing showing the internal stress distribution of the gasket in the compressed state shown in FIG. 6.

FIG. 7 shows the internal stress distribution of the gasket 1 in the compression deformation state shown in FIG. 6. A light color part of a color tone from light color to deep color in FIG. 7 shows high internal stress. As is clear from FIG. 7, the internal stress of each of the first and second end face projection parts 6a and 6b is higher than that of the middle part of the gasket main body part 5. It is easily understood that the surface pressure of the second end face projection part 6b on the second member 3 side is especially high.

In this way, according to the present embodiment, in a case where the two members 2 and 3 butt against each other, and the gasket 1 is compressed and deformed (elastic deformation) inside the gasket groove 4, while limiting the deformation of the middle part of the gasket main body part 5 toward the width direction, it is possible to positively compress and deform both of the first and second end face projection parts 6a and 6b. With this, it is possible to sufficiently secure the surface pressure functionally required, and even if the size of the cross sectional shape of the gasket 1 is reduced, it is possible to stably maintain a predetermined function.

When the present inventor carried out an experiment to compare the gasket 1 of the above present embodiment with a conventional equivalent thereto, in the present embodiment, it has been confirmed that the size of the sectional area of the gasket 1 can be reduced by approximately 20%. In addition, when the present embodiment is compared with a conventional equivalent thereto, it has been confirmed that initial surface pressure can be increased by approximately 40%, and the rate of compression permanent set in fatigue can be reduced by approximately 30%.

Moreover, as shown in FIG. 1 and FIG. 3, in the four places in the longitudinal direction or the circumferential length direction of the gasket 1, the small projection portions 10, each of which functions as a slip-off preventing means, disposed on corresponding ones of the pressure-contact surfaces 5a are not formed over the entire circumference in the longitudinal direction or the circumferential length direction of the gasket 1 but are formed at minimum intervals in the longitudinal direction or the circumferential length direction for achieving a predetermined object, without inhibiting the suppression effect of the lowering of the surface pressure or the maintaining effect of the surface pressure. In addition, even in a case where the groove width W1 of the gasket groove 4 shown in FIG. 4 has the maximum tolerance within a permissible dimensional tolerance, and the maximum width dimension W of the gasket main body part 5 shown in FIG. 2 has the minimum tolerance within a permissible dimensional tolerance, the projection amount of each of the projection portions 10 is set such that each of the projection portions 10 is brought into pressure contact with a corresponding one of the inner side surfaces 4b of the gasket groove 4. Consequently, as shown in FIG. 4, even in the free state in which the gasket 1 has been inserted into the gasket groove 4, free state which is a state before the compression deformation of the gasket 1, each of the projection portions is brought into pressure contact with a corresponding one of the inner side surfaces 4b of the gasket groove 4. It is therefore possible to suppress the slipping-off of the gasket 1 from the gasket groove 4 in the state of FIG. 4.

In addition, in the present embodiment, as mentioned above, the case where the gasket 1 is applied to the joint part between the cylinder head of the engine and the intake manifold has been explained. However, the part to be applied is not limited to this part. For example, the gasket 1 can be also used as a gasket for joint parts of a throttle valve, EGR pipe, etc. attached to the engine. In addition, the shape in plan view of the gasket 1 is not limited to an oval or elliptic closed-loop shape, and may be, for example, a circular shape, a square or an octagon in accordance with the groove circumferential shape of a part to be applied.

Moreover, in a case where the slip-off preventing effect from the gasket groove 4 is exhibited by the frictional force of the gasket 1 itself, and the gasket 1 can be held in the gasket groove 4 by itself, the projection portions 10 used for the slip-off prevention are not always necessary. On the other hand, even in a case where the projection portions 10 used for the slip-off prevention are equipped, the number the projection portions 10, and the position and the shape of each the projection portions 10 are not limited to the above embodiment. That is, it is enough that a shape as the shape of each of the projection portions 10 can exhibit the slip-off preventing effect, and, for example, the shape of each of the projection portions 10 can be an arbitrary shape other than a circular shape, and it is also possible to be continuously formed over the entire circumference of the gasket 1 as needed.

Figure 8:
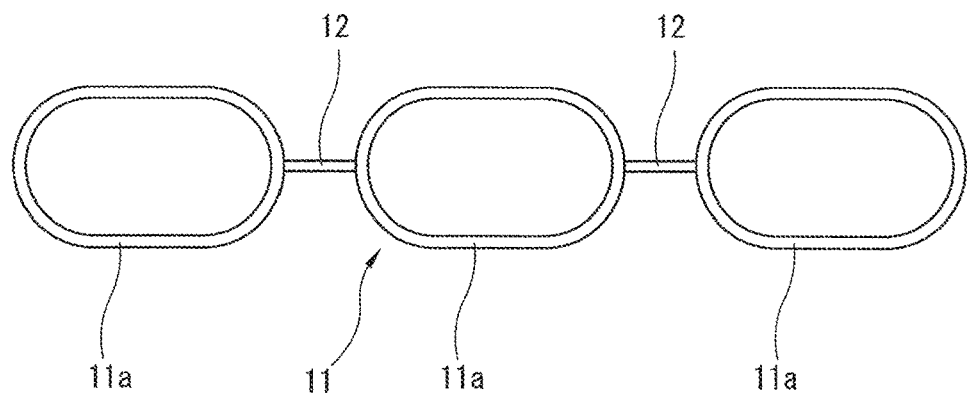
FIG. 8 is a drawing showing a second embodiment for implementing the sealing structure according to the present invention, and is a plan explanation view showing another embodiment of the gasket which becomes the main element of the sealing structure.

FIG. 8 shows a second embodiment of a sealing structure according to the present invention, and the same element or component as that of the first embodiment is denoted by the same reference sign.

In this second embodiment, the gasket 1 shown in FIG. 1 is used as a gasket piece 11a. Three gasket pieces 11a are connected through bridge parts 12 extending in the major axis direction of each of the gasket pieces 11a, bridge parts 12 each of which is disposed between the gasket pieces 11a, and the gasket pieces 11a and the bridge parts 12 are formed integrally, and a so-called triple gasket 11 is formed.

As shown in FIG. 9, in, for example, a three-cylinder engine 13, when, for example, intake ports 14 of the cylinder head made of aluminum alloys and an intake manifold 15 made of resin are connected, the triple gasket 11 is inserted into a gasket groove (not shown in the drawings) formed in a flange part 15a on the intake manifold 15 side. In addition, by simultaneously using three gaskets 1 of the first embodiment shown in FIG. 1, the gasket 1 can be used in a form similar to the triple gasket 11 of FIG. 9.

The second embodiment is only different from the first embodiment in that the three gasket pieces 11a are used as the triple gasket 11. Therefore, in the second embodiment, the same effect as that of the first embodiment can be obtain.

The entire contents of Japanese Patent Application No. 2016-238957 filed on Dec. 9, 2016 are incorporated herein by reference.

The invention claimed is:

1. A sealing structure comprising:
a gasket groove formed in a first member; and
a gasket inserted into the gasket groove, wherein the gasket is compressed and deformed by butting of the first member against a second member, and a space between the first member and the second member is sealed, wherein inner side surfaces positioned on both respective sides of a groove bottom surface of the gasket groove are formed parallel to each other, wherein the gasket, in a section thereof, comprises:
- a gasket main body part including outer side surfaces which, in a width direction, are configured as pressure-contact surfaces for corresponding ones of the inner side surfaces of the gasket groove; and
- first and second end face projection parts projecting to opposed sides in a height direction orthogonal to the width direction from the gasket main body part, and each having a width narrower than that of the gasket main body part and each having a tapered shape, wherein the first end face projection part is brought into pressure contact with the groove bottom surface and the second end face projection part is brought into pressure contact with the second member, wherein each of the pressure-contact surfaces of the gasket main body part is formed as an arc-shaped surface formed in a convex shape projecting toward a corresponding one of the inner side surfaces of the gasket groove, wherein a ratio of a sum of sectional areas of both of the first and second end face projection parts to a whole sectional area of the gasket is 30% or less, wherein a height of the first end face projection part is equal to a height of the second end face projection part, and wherein in the section of the gasket, tip end surfaces of the respective first and second end face projection parts are each formed in an arc-shaped surface, and a ratio of a curvature radius of each of the tip end surfaces of the respective first and second end face projection parts to a width of the gasket main body part is 15% or less.

2. The sealing structure according to claim 1, wherein a base sectional shape of the gasket is formed to be uniform in a longitudinal direction, and wherein a pair of projection portions is formed and arranged in the height direction on a part of each of the pressure-contact surfaces in the gasket main body part in the longitudinal direction.

3. The sealing structure of claim 1, wherein a height of the gasket main body part is set to half of a height of the whole gasket.

4. The sealing structure of claim 3, wherein a maximum width of the gasket main body part is set equal to the height of the gasket main body part.

5. The sealing structure of claim 1, wherein a maximum width of each of the first and the second end face projection parts is set to be smaller than a minimum width of the gasket main body part.

* * * * *